United States Patent [19]

Takenaka

[11] Patent Number: 4,742,227
[45] Date of Patent: May 3, 1988

[54] MOBILE TYPE INSPECTION APPARATUS
[75] Inventor: Toshio Takenaka, Kobe City, Japan
[73] Assignee: Mitsubishi Denki Kabushiki Kaisha, Japan
[21] Appl. No.: 867,214
[22] Filed: May 27, 1986
[30] Foreign Application Priority Data May 29, 1985 [JP] Japan .................................. 60-114303
Aug. 2, 1985 [JP] Japan .................................. 60-169734

[51] Int. Cl.⁴ ........................... G01J 1/00; G01T 1/00
[52] U.S. Cl. .................................. 250/336.1; 374/102
[58] Field of Search ..................... 250/336.1, 342, 339, 250/358.1; 374/102, 141, 142

[56] References Cited

U.S. PATENT DOCUMENTS 3,831,450  8/1974  Schipke et al. ...................... 374/102
3,931,619  1/1976  Moore et al. ........................ 374/102
4,034,222  7/1977  Azam et al. ...................... 250/336.1

FOREIGN PATENT DOCUMENTS 2142500  1/1985  United Kingdom ................ 340/600

OTHER PUBLICATIONS

"Tele-Operated Robot for Inspection Inside the PCV",
Sadakane et al., *Procedure Conference on Remote Systems Technology*, 20th(½), II-56-63, 1982.

Primary Examiner—Janice A. Howell
Assistant Examiner—William F. Rauchholz
Attorney, Agent, or Firm—Leydig, Voit & Mayer

[57] ABSTRACT

A mobile type inspection apparatus for monitoring conditions in an environment or a facility containing radiation and a high temperature has a radiation dosage detector, a temperature detector, and a moisture detector disposed on a movable vehicle. Signals representing the monitored conditions are transmitted to a remote receiver which is included in a control system for operating the inspection apparatus and which has monitors for monitoring the conditions. Signals representing radiation dosage are supplied to a monitor and also to a comparison circuit for comparing radiation resistance limit data for the detectors which is stored in a memory with the detected data so as to generate a device exchange request when the accumulated radiation dosage exceeds the limit of any one of the devices. In a second embodiment, signals representing temperature and moisture are used for monitoring and also to calculate reaction acceleration and using time of the detectors to determine degree of deterioration thereof.

13 Claims, 6 Drawing Sheets

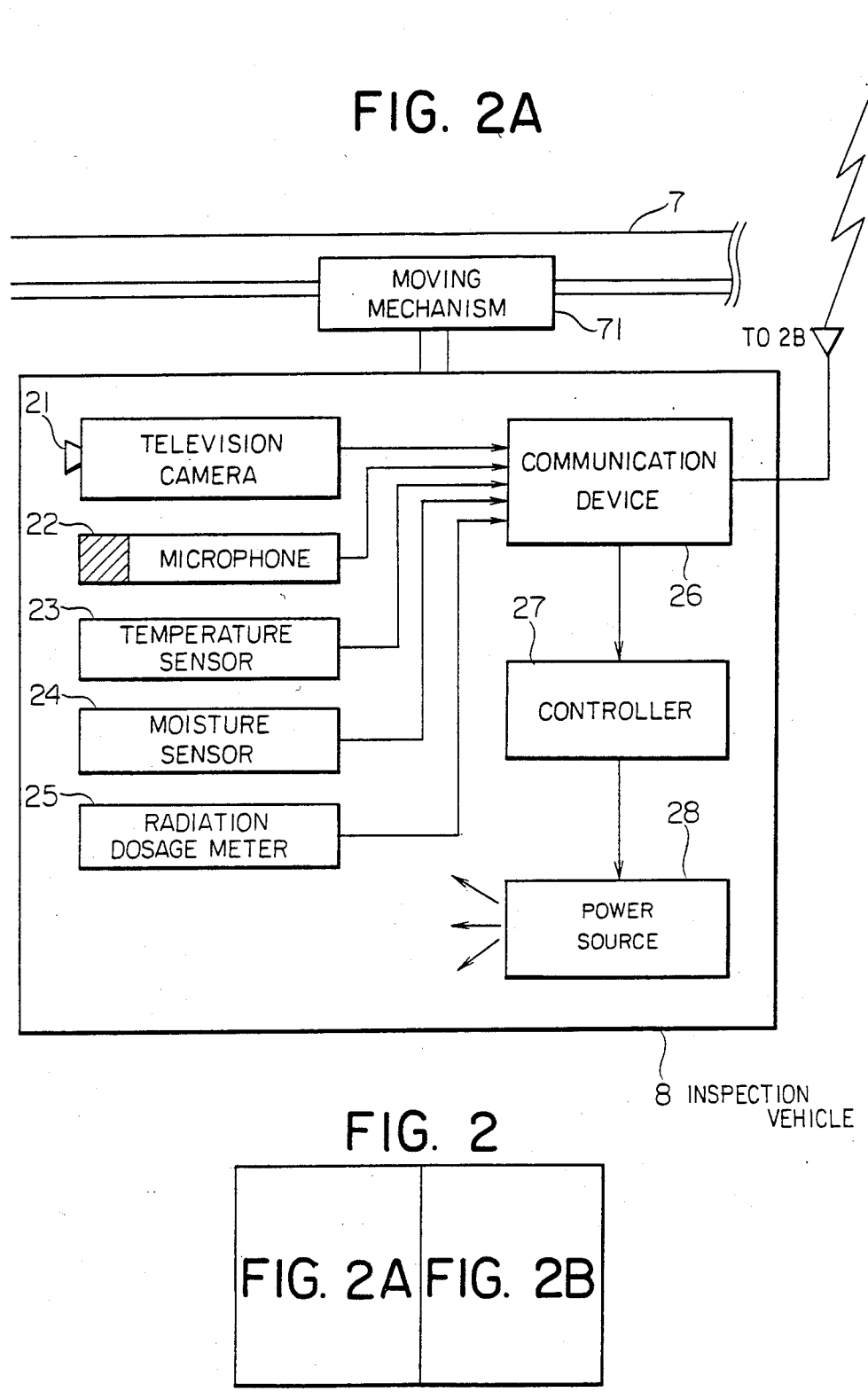

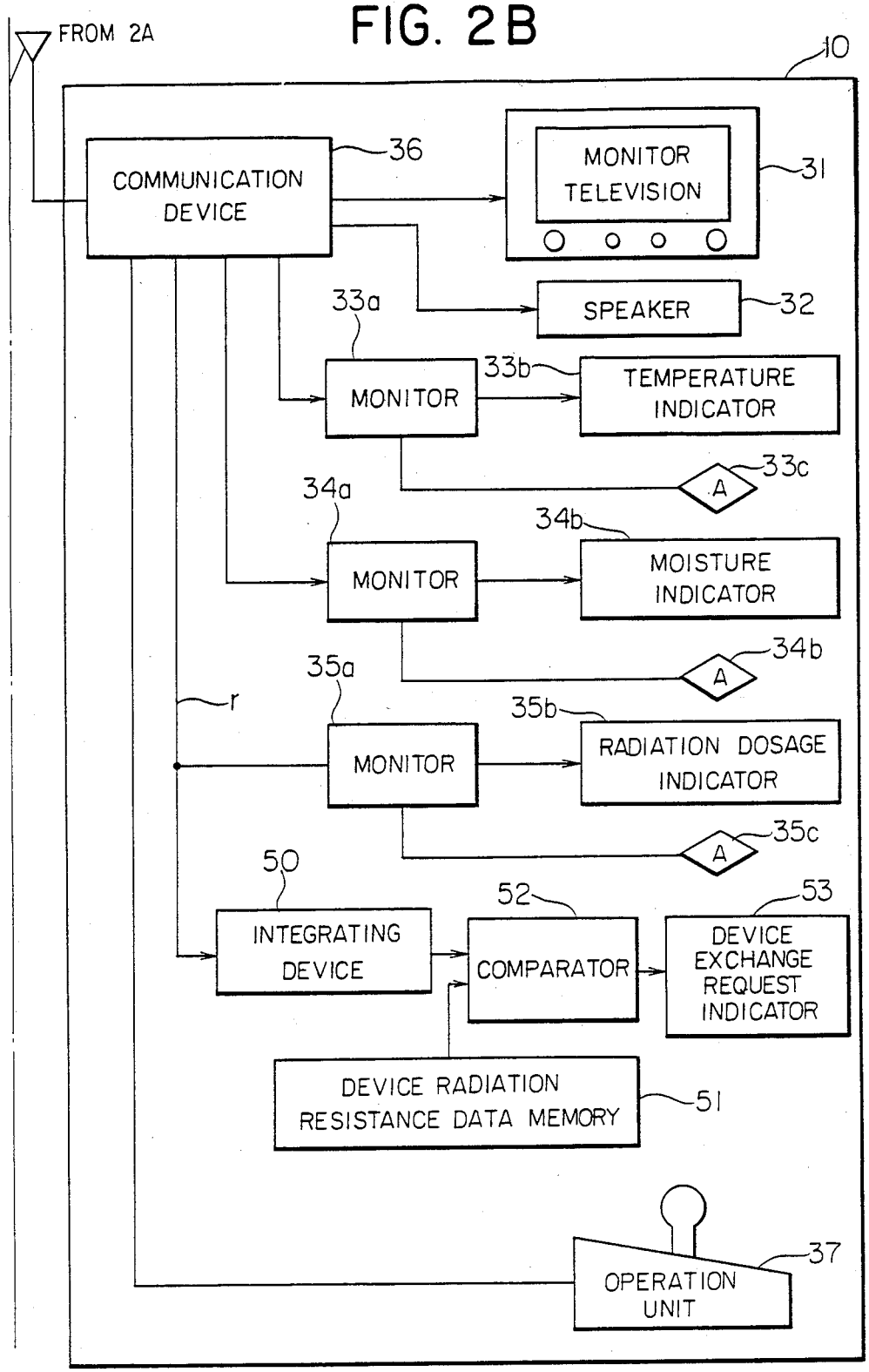

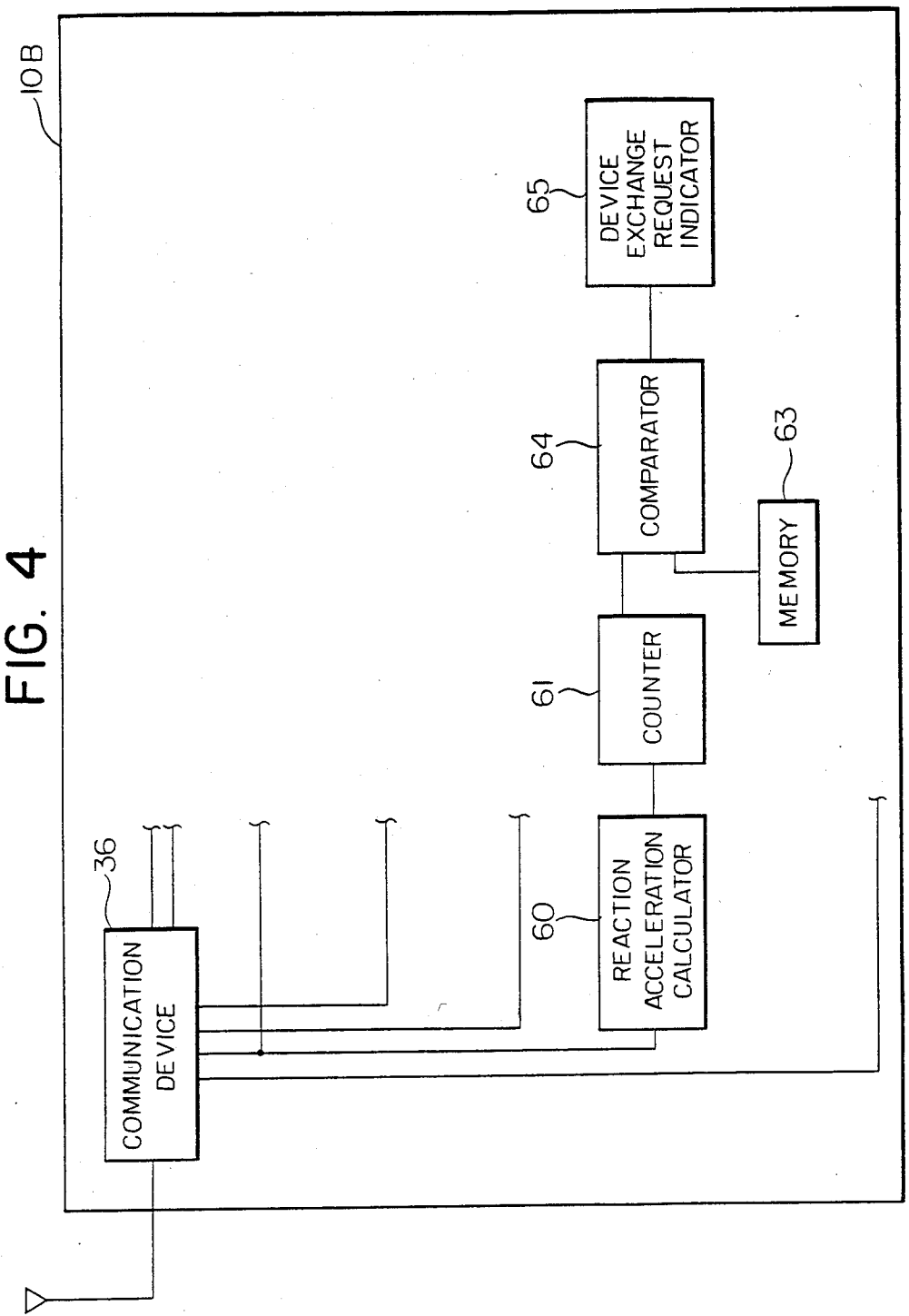

MOBILE TYPE INSPECTION APPARATUS

BACKGROUND OF THE INVENTION

This invention relates to a mobile type inspection apparatus and, more particularly, to a mobile type apparatus for automatically and remotely monitoring or inspecting various types of facilities and devices under high temperature and environments such as in an atomic power plant.

FIGS. 1a–1d show a conventional mobile type inspection apparatus of this type as disclosed in Japanese Patent Laid-open No. 52-52091, wherein FIG. 1(a) is a side view showing the disposition of an atomic power plant and the inspection apparatus, FIG. 1(b) is a plan view of FIG. 1(a), FIG. 1(c) is a schematic view showing the structure of an inspection vehicle in the inspection apparatus, and FIG. 1(d) is a functional block diagram of the inspection apparatus. In FIGS. 1(a) and 1(b), an atomic reactor housing AH contains an atomic reactor 1 and an atomic reactor containing vessel 2 for containing the reactor 1. A turbine generator housing GH contains a high pressure turbine HP, a low pressure turbine LP, and an electric generator G. These turbines are disposed adjacent to one another, and high temperature and high pressure steam generated in the reactor 1 drives the turbines HP, LP and the generator G through a conduit 3, and is then circulated through a condenser 4, a water distribution pump 5, a conduit 6 to the reactor 1. Reference numeral 7 designates a monorail which is laid on suitable positions in both the housings. Reference numeral 7a designates a folding loop. In FIG. 1(c), reference numeral 8 designates an inspection vehicle in a mobile type inspection apparatus, which is placed on the monorail 7 via wheels 8a, and an ITV camera 9 is provided at the top of the vehicle, and also various sensors are provided at suitable positions on the vehicle. A transceiver line 7b is laid in the wheel groove of the monorail 7 to communicate necessasry signals between the vehicle and a remote controller such as a central operation board. In FIG. 1(d), various siganls from the vehicle 8 are transmitted to the corresponding monitor of the central operation board 10, indicated on instruments on a panel 10a and necessary alarms are generated.

The vehicle 8 runs along the monorail 7 laid in the housing AH and GH to detect various pieces of information of the surrounding equipment. More specifically, the ITV camera detects the external malfunctions of the facilities and devices such as water or steam leakage from valves, an acoustic sensor detects the malfunction sound when motors and pumps operate or detects the presence or absence of malfunction sound generated upon leakage of steam, a temperature sensor, a moisture sensor and a radiation sensor respectively detect variations in the temperature, the moisture and the radiation dosage upon leakage of coolant in the reactor, and further an infrared ray television camera collects infrared rays radiated from high temperature and high pressure steam to detect the leakage. The above-mentioned operations can be automatically or remotely performed by moving the vehicle 8 along the monorail 7.

The inspection vehicle of the above-mentioned mobile inspection apparatus carries various types of electronic devices and units, which gradually deteriorate in high temperature environments as the inspection vehicle moves in the atomic reactor housing where radioactive rays are emitted and finally become unfit for use. However, since the degree of the progress of the deterioration of the electronic devices and units varies largely according to the conditions of use of the inspection vehicle, it is difficult to accurately predict lifetime of a device or when failure of a device will occur. Thus, there arises a problem that devices might fail, or the end of functional life of a device might occur, while the vehicle is being used.

SUMMARY OF THE INVENTION

An object of this invention is to eliminate the disadvantages and the problems described above, and its main object is to provide a mobile inspection apparatus capable of accurately predicting the degree of the progress of the deterioration of electronic devices and units carried on the inspection vehicle by providing a predetermined processor in an operation board for controlling the movement of the vehicle.

BRIEF DESCRIPTION OF THE DRAWINGS

FIG. 2 shows the structure of a mobile type inspection apparatus according to a first embodiment of this invention, wherein FIG. 2(A) shows the structure of an inspection vehicle and FIG. 2(B) shows the structure of an operation board;

FIG. 4 is a view showing a partly modified example of the second embodiment of the invention.

In the drawings, the same symbols indicate the same or corresponding parts.

DESCRIPTION OF THE PREFERRED EMBODIMENTS

Figure 1A:
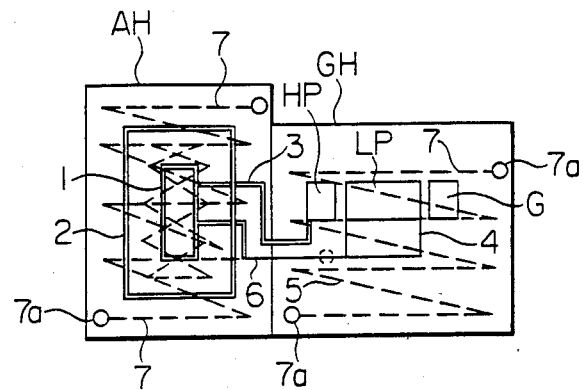
FIGS. 1(a) to 1(d) are explanatory views of a conventional mobile inspection apparatus.
Figure 1B:
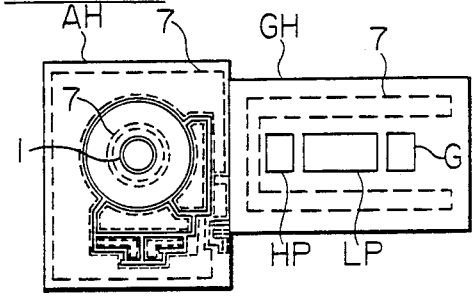
Figure 1C:
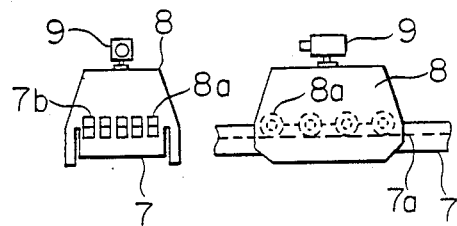
Figure 1D:
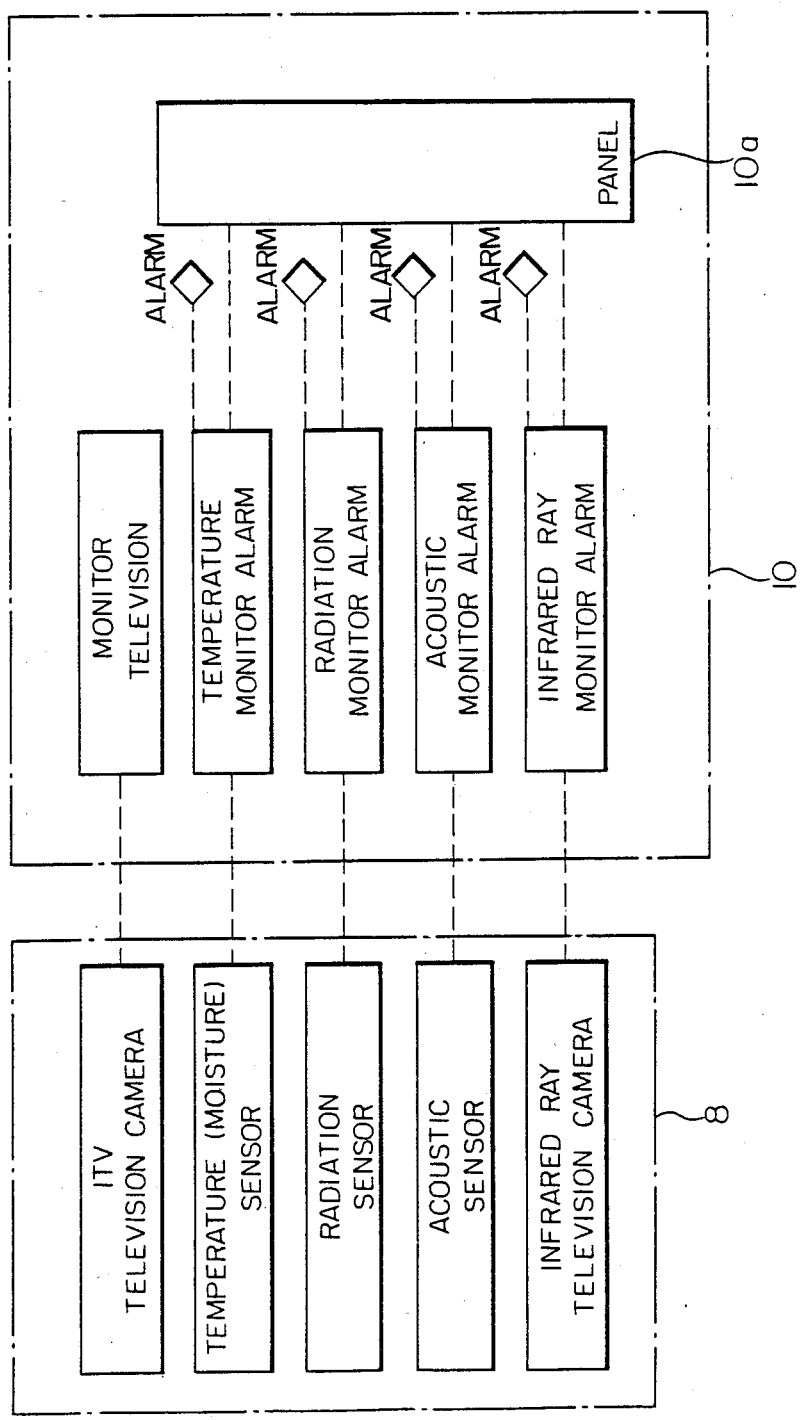

A first embodiment of this invention will be described in detail with reference to FIG. 2 which includes FIG. 2A and FIG. 2B. As shown reference numeral 7 designates a monorail laid along a circulating inspection route through an environment, numeral 71 designates a moving mechanism, numeral 8 designates an inspection vehicle which carries inspection devices, and numeral 10 designates an operation board installed in a safe place, such as a central control room, for remotely operating the vehicle 8 via radio communication.

Inspection devices to be carried on the vehicle 8 for monitoring conditions in the environment include a television camera 21, a microphone 22, a temperature sensor 23, a moisture sensor 24, and a radiation dosge meter 25 for detecting the intensity of environmental radiation on the inspecting devices disposed in the environment, and additionally, a communication device 26 for receiving various output signals, a controller 27 for controlling the device 26, and a power source 28 for all the devices.

The operation board 10 includes a communication device 36 for communicating with the device 26 of the vehicle 8, an operation unit 37 for operating the vehicle 8, a monitor television 31, a speaker 32 and monitors 33a, 34a, 35a for indicating or monitoring signals received through the device 36 from the camera 21, the microphone 22, the sensors 23, 24 and the meter 25 carried on the vehicle 8, and further a temperature indicator 33b, an alarm unit 33c, a moisture indicator 34b and an alarm unit 34c, a radiation dosage indicator 34b and an alarm unit 35c connected with these monitors.

The radiation dosage signal r from the device 36 is also input to an integrating device 50, the output signal from the device 50 and the output signal of a device radiation resistance data memory 51 for storing the radiation resistance data of the devices carried on the vehicle 8 are compared by a comparator 52, and a signal for requesting the exchange of the device is generated by a device exchange request indicator 53 from the compared result.

The operation of the apparatus constituted as described above will be described.

An operator operates the operation unit 37 of the operation board 10 to allow the vehicle 8 to circulate along the monorail 7 laid in the atomic power plant, monitors and inspects various signals fed through the devices 26 and 36 from inspecting devices carried on the vehicle 8 (the television camera, the microphone, the temperature sensor and the moisture sensor) and the radiation dosage meter 25 by means of the monitor television 31, the speaker 32, the temperature indicator 33b, the moisture indicator 34b, and the radiation dosage indicator 35b. The temperature, the moisture and the radiation dosage of the environmental radiation intensity are ordinarily automatically monitored by the monitors 33a, 34a, 35a, as is known from prior art, and when they exceed the predetermined values, the alarms 33c, 34c g and 35c generate alarms.

On the other hand, a radiation dosage signal r from the dosage meter 25 to the integrating device 50 is integrated by the device 50, and compared by the comparator 52 with the content of the memory 51 which stores the radiation available limit data of the inspecting devices. Since the available limit data can be determined and stored for the respective devices by evaluation test of radiation damage in advance of operation, if the output of the device 50 exceeds the stored value, a signal for requesting the exchange of the device is generated by the device exchange request indicator 53 to the operator. The operator exchanges the device according to the signal, and the device 50 is then manually reset.

These operations may employ the data matched to the inspecting devices of the weakest radiation of the radiation resistance available limit data stored in the memory to be compared as the integrated radiation dosage, or when radiation resistance available limit data is prepared separately in the inspection devices carried on the vehicle 8 as required and the memory 51 is switched to individually integrate and compare, more accurate exchange request can be generated for the operator to perform efficient maintenance. In the embodiment described above, the device 50 for integrating the output of the meter 25 is mounted in the operation board 10. However, the device 50 may be provided in the vehicle 8, and, in this case, even if the entire system is not operated, only the meter 25 and the device 50 may be energized by the power source 28, and the integrating operation of the radiation dosage may be continued. The radiation exposure of the inspecting device during nonoperation can be integrated to monitor the devices more accurately.

According to the thought reaction velocity theory, troubles of various devices occur due to the physical and chemical change such as oxidation or corrosion or dislocation of the parts or material and depend upon the temperature. The lifetime of these devices can be predicted by suitable failure model or experimental rule with considerable probability. For example, according to Arrhenius model, the reaction velocity K can be represented by the following equation $$K = \Lambda \exp(-E/kT)$$

where k is Boltzmann constant, E is the activating energy of the reaction, T is absolute temperature, and $\Lambda$ is a proportional constant. As recognized from the above equation, the deterioration of the device is accelerated proportional to the exponential of the temperature.

A second embodiment of this invention has been proposed on the basis of this thought, and will be described with reference to FIG. 3.

Figure 3:
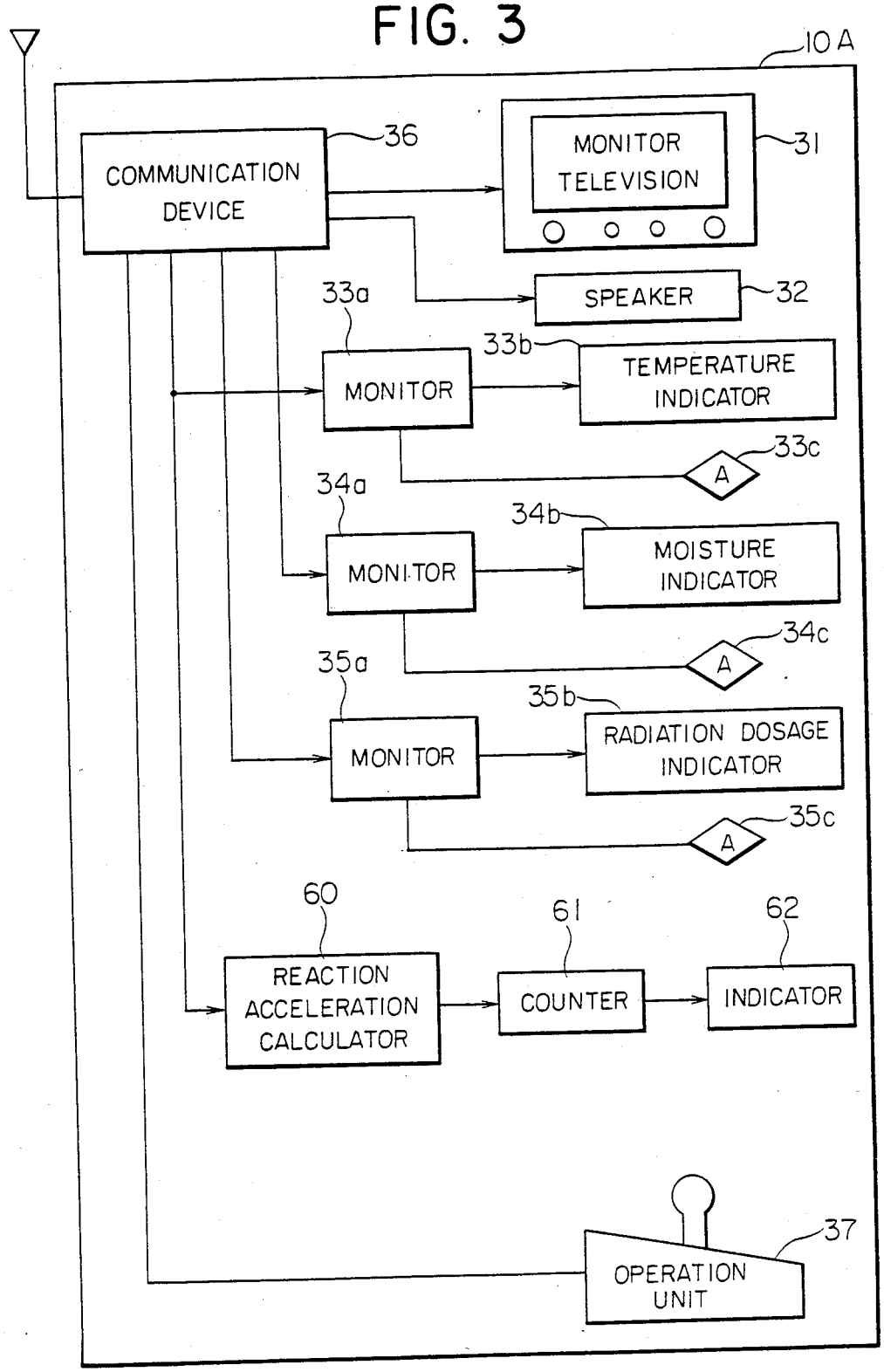
FIG. 3 is a schematic view showing the structure of the inspection apparatus according to a second embodiment of the invention.

In FIG. 3, since an inspection vehicle has the same structure and operation as that of the first embodiment, the description will be omitted. Reference symbol 10A designates an operation board, which is mounted on a safe place such as in a central control room. A communication device 36 provided at the side of the board 10A is connected with an operation unit 37 and various types of indicators to be described later. More particularly, the indicators include a monitor camera 31, a speaker 32, a monitor 33a and corresponding temperature indicator 33b with an alarm unit 33c, a monitor 34a and corresponding moisture indicator 34b with an alarm unit 34c, a monitor 35a and corresponding radiation dosage indicator 35b with an alarm unit 35c, and a reaction acceleration calculator 60 and a corresponding counter 61, and an indicator 62.

The operation of the apparatus thus constituted will be described. When the operator suitably operates the unit 37 on the board 10A provided in the central control room, the vehicle runs along the monorail. Signals generated from various inspecting sensors carried on the vehicle are received through the communication device of the vehicle and the communication device 36 of the board 10A, and monitored and inspected by the various indicators provided on the board 10A. The temperature, the moisture and the radiation dosage are automatically monitored by the corresponding monitors 33a, 34a, 35a, and if any of these values exceed a predetermined value, corresponding alarm is generated.

On the other hand, a signal from the temperature sensor (in the vehicle) applied to the montior 33a is also applied to a reaction acceleration calculator 60, and the acceleration of the reaction due to the temperature is calculated. To this end, the above-mentioned Arrhenius model may be used, or the temperature test of the device to be measured is actually performed, and the temperature acceleration thus experimentally obtained may also be used. It is converted to time at a predetermined reference temperature (e.g., 25° C. at room temperature) by the counter 61 on the basis of the calculated result to obtain the accumulated using time, thereby indicating on the indicator 62. In other words, the substantial accumulating using time of the device to be measured is indicated at the predetermined reference temperature on the indicator 62. The operator may judge the degree of the deterioration of the device to be measured on the basis of the indicated content, and he can exchange the corresponding device before reaching its lifetime. After exchange, the content of the counter 61 is reset to the initial value.

FIG. 4 shows a modified example of the second embodiment described above. In FIG. 4, reference numeral 63 designates a memory, which holds data relative to the lifetimes of the devices to be meausred. Numeral 64 designates a comparator which compares the counted values obtained through the calculator 60 and counter 61 similar to the embodiment of FIG. 3 with the data from the memory 63, and applies the output signal generated depending upon the result to a device exchange request indicator 65 in the later stage. According to this modified example, the exchange request of the device to be measured is output from the board 10B to the operator.

In the embodiments described above, the case in which one reaction acceleration calculator and one corresponding counter are provided in the operation board has been described. However, the invention is not limited to the particular embodiments. For example, suitable numbers of the devices may be provided to increase the number of devices or parts whose lifetimes are to be predicted thereby individually accurately predicting the lifetimes of the respective devices for the temperature acceleration, and since the devices can be individually accurately considered for their lifetimes, the devices to be truly required to be exchanged can be selected for more accurate maintenance.

In the embodiments described above, the case that the reaction acceleration calculator and the corresponding counter are provided in the operation board has been described. However, the invention is not limited to the particular embodiments. For example, these devices may be carried on the vehicle. In this case, the calculator, the corresponding counter and the temperature sensor are energized continuously even if the inspecting operation is not performed, the degree of the deterioration of the devices due to the temperature when the inspecting operation is not performed can be taken into account to more accurately predict the lifetime of the devices.

Further, in the embodiments described above, the case that the signal from the temperature sensor is applied to the reaction acceleration calculator has been described. In addition, the signal from the moisture sensor may be applied. Thus, the lifetimes of the devices can be more accurately predicted. However, in this case, the variation in the reaction acceleration due to the humidity of the devices to be measured must necessarily be obtained experimentarily.

What is claimed is:

1. A mobile type inspection apparatus for monitoring an environment, said inspection apparatus comprising:
   a plurality of detecting devices having means for monitoring a condition within the environment and producing an output containing data as to the monitored condition, one of said devices detecting intensity of radiation within the environment;
   a control means located remotely from the environment being monitored and having means for receiving signals representing the outputs from said detecting devices and for indicating a monitored condition based upon the output data;
   said control means further including deterioration monitoring means comprising:
   a memory means storing radiation resistance limit data corresponding to radiation levels that can be received by the respective detecting devices without damage thereto; and
   means for comparing an output of said receiving means with the limit data stored in said memory as to each of the plurality of detecting devices and for generating exchange request signals for each of the detecting devices on the basis of the comparisons.

2. A mobile type inspection apparatus according to claim 1 wherein one of said detecting devices includes a radiation dosage meter and wherein said deterioration monitoring means includes an integrating device which integrates data produced by said radiation dosage meter.

3. A mobile type inspection apparatus according to claim 2 wherein said radiation dosage meter is disposed on a vehicle moving in a predetermined manner within the environment, and wherein said integrating device is disposed at a remote place.

4. A mobile type inspection apparatus according to claim 2 wherein said radiation dosage meter and said deterioration monitoring means are continuously energized.

5. A mobile type inspection apparatus according to claim 1 wherein said memory means supplies the radiation resistance limit data of any of said detecting devices.

6. A mobile type inspection apparatus according to claim 1 wherein said memory means supplies the lowest radiation resistance limit data of corresponding detecting devices to said comparison means for comparison.

7. A mobile type inspection apparatus for monitoring an environment, said inspection apparatus comprising:
   a plurality of detecting devices having means for monitoring the environment and producing an output containing data as to a monitored condition, one of said detecting devices having means for detecting temperature within the environment;
   a control means located remotely from the environment being monitored and having means for receiving signals representing the outputs from said detecting devices and for indicating a monitored condition based upon the output data;
   said control means further including deterioration monitoring means comprising:
   calculating means for calculating accumulated using time reflecting reaction acceleration of the detecting devices using an Arrhenius model and an output of said receiving means representing temperature within the environment detected by said one of said detecting devices; and
   means for indicating accumulated using time based upon an output of said calculating means to represent degree of deterioration of the detecting devices.

8. A mobile type inspection apparatus according to claim 7 wherein said detecting devices include a television camera, a temperature sensor, and a moisture sensor, and wherein outputs of said receiving means representing data from said temperature sensor and data from said moisture sensor are applied to said calculating means.

9. A mobile type inspection apparatus for monitoring an environment comprising a plurality of detecting devices for detecting a condition within the environment including a temperature sensor for generating signals representing detected temperatures, an inspection vehicle movable within the environment, and a control means located remotely from the environment being monitored for controlling the running of said vehicle, said control means including a monitor monitoring the temperature within the environment on the basis of temperature representing signals generated by the temperature sensor, a reaction acceleration calculator receiving signals based on hte temperature signals and determining using time of said detecting devices on the basis of the detected temperatures, a counter for accumulating the using time as data, and an indicator connected to receive the data from said counter representing the accumulated using time of the detecting devices.

10. A mobile type inspection apparatus accoring to claim 9 wherein said control means further comprises a memory means for storing data relative to expected lifetimes of the detecting devices and means for comparing the accumulated using time data with the lifetime data stored in memory so as to indicate the degree of deterioration of said detecting devices.

11. A mobile type inspection apparatus according to claim 9 further comprising a moisture sensor and wherein a signal from said temperature sensor and a signal from said moisture sensor are applied to said reaction acceleration calculator.

12. A mobile type inspection apparatus monitoring an environment, said inspection apparatus comprising:
- a plurality of detecting devices having means for monitoring a condition within the environment and producing an output containing data as to a monitored condition;
- a transmitter transmitting signals representing the data as to the monitored condition produced by the detecting devices and based upon the outputs thereof;
- a control means located remotely from the environment being monitored and having a receiver means for receiving the signals from the transmitter and producing output signals representing the data produced by the detecting devices;
- said control means including monitor means receiving the output signals and indicating the monitored condition based upon the data produced by the detecting devices; and
- said control means further including means receiving the output signals and determining degree of deterioration of the detecting devices based upon the data produced by the detecting devices.

13. A mobile type inspection apparatus according to claim 12 wherein said detecting devices are carried on a vehicle component of the inspection apparatus.

* * * * *